G. CHRISTENSON.
PISTON PACKING.
APPLICATION FILED JUNE 8, 1917.
1,273,736.
Patented July 23, 1918.
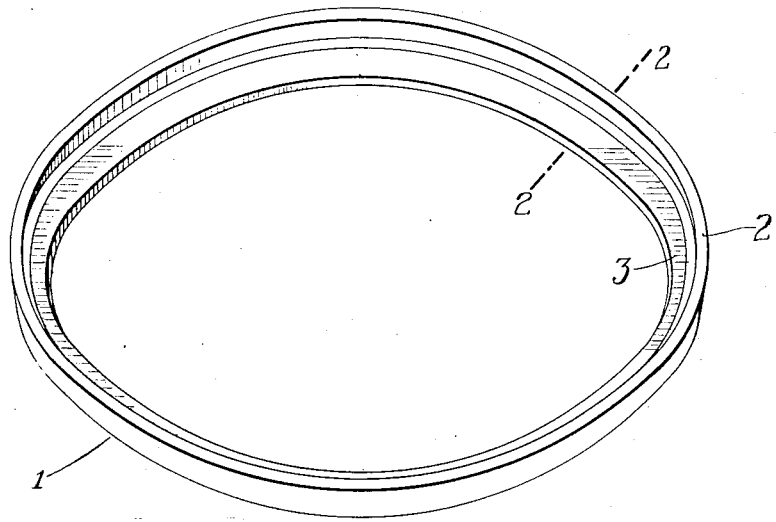
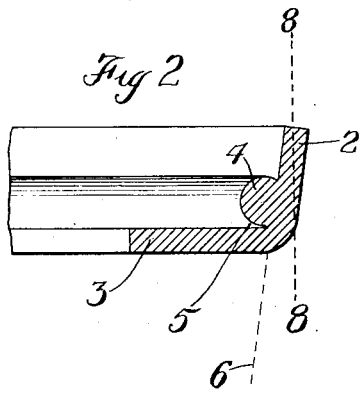
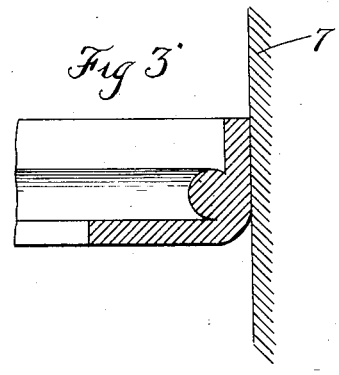
INVENTOR
George Christenson
BY
ATTORNEY

UNITED STATES PATENT OFFICE.

GEORGE CHRISTENSON, OF JAMAICA, NEW YORK, ASSIGNOR TO H. W. JOHNS-MANVILLE COMPANY, A CORPORATION OF NEW YORK.

PISTON-PACKING.

1,273,736.   Specification of Letters Patent.   Patented July 23, 1918.

Application filed June 8, 1917. Serial No. 173,503.

*To all whom it may concern:*

Be it known that I, GEORGE CHRISTENSON, a citizen of the United States of America, residing at Jamaica, county of Queens, State of New York, have invented certain new and useful Improvements in Piston-Packing, of which the following is a specification.

My invention relates to piston packing and comprises a special form of cup-shaped packing particularly useful on pistons in air brake cylinders. Heretofore cup-shaped packings of leather have been employed in air brake equipment and the use of various forms of elastic expander rings have been required to hold the cylindrical portions of the cups against the cylinder wall so as to prevent leakage. These cup leathers wear out rapidly, and even before wearing out get in such condition from porosity that leakage of air rapidly increases. This difficulty is aggravated by the fact that the Interstate Commerce regulations now require that such leakage shall not occur in engine brakes to an extent creating a fall of more than a few pounds pressure within a given time, and have thus established a standard with which cup leathers cannot comply. I have, after long experiment, discovered a form of packing which is involved in my present invention and which under prolonged test has retained the air pressure in the brake cylinder even after being subjected to several hundred thousand cycles of operation. One form of packing embodying my invention is illustrated in the accompanying sheet of drawings in which—

Figure 1 is a perspective view of the completed ring of packing.

Fig. 2 is a cross section on line 2—2 of Fig. 1, parts being broken away, and

Fig. 3 is a similar cross section of the same portion of the ring, and of a portion of the cylinder wall, showing the position which the ring assumes when in use.

Throughout the drawings like reference characters indicate like parts. 1, is the cup-shaped packing ring generally which is composed of a substantially cylindrical body 2, having a radial flange 3, attached to one end of said body. Preferably I so shape the materials as to give the substantially cylindrical body 2, a slight flare outward from the flange 3. On the inner face of the portion 2, of the ring and adjacent to its junction with the flange 3, is a bead 4. Preferably this bead 4, has in cross section the shape of a portion of a circle which will be left on the outside of a chord formed by a projection of the inner face of the body 2, as indicated by the dotted line 6. Normally, that is before the packing ring is forced into the cylinder, there is a slight space 5, left under the bead 4. When, however, the packing is placed upon a piston and forced into the cylinder and the body portion 2, is forced into an exactly cylindrical shape, the bead 4, will, as shown in Fig. 3, be forced down upon the flange 3, so as to practically eliminate any intervening space between the two.

In Fig. 3, 7 represents a portion of the cylinder wall and in Fig. 2 the dotted line 8—8 represents the position such wall would occupy when the packing is in the cylinder and shows the slight degree of outward flare which the part 2 has.

The mode of operation of this form of packing resulting from its shape is that the solid bead 4, being compressed and somewhat distorted by the forcing inward of the ring shaped body portion 2, reacts and exerts a positive elastic pressure resulting from its compression and torsional distortion tending to force the ring-shaped portion 2, outward and thereby insuring the tight joint between the edge of the packing and the cylinder wall without requiring the use of any spring expander rings or other metallic springs for insuring such contact. My invention therefore enables me to save the cost of the piston packing expanders now quite generally used in air brake systems and which have greatly increased in cost recently on account of the high price of steel.

While the foregoing advantages of my invention result from a packing ring made in the shape described of any proper material, I prefer to make the ring of asbestos cloth folded and treated with rubber, shaped in a die and vulcanized while in the die, as this results in the packing having the most lasting qualities, great resistance to heat and moisture, and permanent elasticity. Any other material will serve the purpose which is of slightly compressible, resilient character which permits of, but yieldingly resists, distortion of the parts such as above described. Obviously a metal or other incompressible material would not serve, as a continuous ring formed of such material would be absolutely rigid and incapable of radial contraction, and subsequent expansion under elastic forces. As before explained any slight radial compressibility of the lip 2, and resulting distortion of the part 4, creates an elastic reaction or tendency to expand the lip again outwardly against the cylinder wall, and this is essential to the principle of operation of my invention.

Of course other forms of bead could be substituted for the particular form shown in the drawings without departing from the principle of my invention, but as at present advised I believe the circular form shown to be the best as far as ease of formation and effectiveness of action are concerned.

Having described my invention, I claim:

1. A continuous ring-shaped piston cup-packing formed of resilient and slightly compressible material in which the lip of the cup has an outer wall flaring outwardly from the junction of the lip with the inwardly extending radial flange which forms the remainder of the cup, and in which there is an integral bead formed on the inside of the cup near the junction of the lip and flange.

2. A packing such as described in claim 1 in which the bead has a cross section in the shape of that portion of a circle which would be left outside of a chord which the line of the inner face of the lip would form if projected through the bead to intersect the line of the inner face of the flange.

3. A packing such as described in claim 1 in which the bead is out of contact with the flange when the packing is free to expand but in which the parts are so proportioned that when the packing is compressed to working position in a cylinder the bead is forced down into contact with the flange.

4. The combination with a cylinder adapted to receive a piston for reciprocation therein, of a continuous ring-shaped piston packing of elastic and slightly compressible material having a normally slightly outwardly flaring body or lip integral with an inwardly extending radial flange adapted to be fastened to a piston head, and an integral bead formed on the inner face of the ring body adjacent to its junction with the flange, the external diameter of the ring at the point of junction of lip and flange being substantially equal to the internal diameter of the cylinder, whereby when the packing is inserted in such cylinder the diameter of the bead and of all portions of the lip except those at the point of junction with the flange are forcibly reduced and the bead distorted so as to exert an outwardly directed elastic reaction on said lip.

GEORGE CHRISTENSON.